United States Patent [19]

Nomura et al.

[11] 4,179,958

[45] Dec. 25, 1979

[54] METHOD FOR SHEARING HOT STRIPS AND DEVICE THEREFOR

[75] Inventors: Susumu Nomura; Hiroyuki Okubo, both of Yokohama; Hiroshi Isozaki, Zushi; Tsutomu Hara; Bunpei Masuda, both of Yokohama, all of Japan

[73] Assignee: Ishikawajima-Harima Jukogyo Kabushiki Kaisha, Tokyo, Japan

[21] Appl. No.: 791,048

[22] Filed: Apr. 26, 1977

[30] Foreign Application Priority Data

Apr. 30, 1976 [JP] Japan .................... 51-49613

[51] Int. Cl.² .............................................. B23D 25/12
[52] U.S. Cl. ............................................ 83/37; 83/337; 83/344

[58] Field of Search ................... 83/37, 337, 343, 344, 83/347, 370

[56] References Cited

U.S. PATENT DOCUMENTS

| 4,058,041 | 11/1977 | Ito ........................................... 83/337 |
| 4,112,798 | 9/1978 | Yoshizawa et al. ..................... 83/344 |

*Primary Examiner*—Donald R. Schran
*Attorney, Agent, or Firm*—Scrivener, Parker, Scrivener & Clarke

[57] ABSTRACT

Both an upper blade carried by an upper drum and a lower blade carried by a lower drum or either of them is so arranged as to describe a non-circular locus when shearing is effected.

1 Claim, 4 Drawing Figures

METHOD FOR SHEARING HOT STRIPS AND DEVICE THEREFOR

DETAILED DESCRIPTION OF THE INVENTION

A fish tail formed at each of the leading and trailing ends of a hot strip rolled by a roughing rolling mill in a hot rolling line is sheared off prior to the feed of the continuously traveling horizontally arranged hot strip to a finishing rolling mill.

Each of an upper blade and a lower blade of the prior art drum type flying shears describes a circular locus. In order to effect complete shearing of a hot strip, the degree of lapping between the upper and lower blades must be increased, but since they describe a circular path, with increase in degree of lapping, the gap or clearance must be inevitably increased.

When the degree of lapping is increased in order to ensure complete shearing of a crop from a hot strip, needle-shaped burrs tend to be formed very often. When a hot strip S is sheared with an upper blade a and a lower blade b as shown in FIG. 4, a burr c results and is ironed or rolled again between the upper and lower blades into a needle-shaped burr d. When the hot strip S with such needle-shaped burrs d enters the work rolls of a finishing rolling mill, they are removed from the strip S and adhere to the work rolls so that the surfaces of the hot strip S are damaged with the resultant decrease in quality. In addition, the needle-shaped burrs also damage the work rolls. Furthermore the increase in gap or clearance due to the increase in degree of lapping often results in incomplete shearing. Recently there has been a trend to increase the thickness of a hot strip from the prior art thickness of about 40 mm to about 80 mm in order to save the energy by reducing the temperature for heating a slab. As a result, both the clearance and the degree of lapping must be increased so that the defects caused by needle-shaped burrs and incomplete shearing tend to occur more often.

One of the objects of the present invention is therefore to provide a method and device for shearing hot strips which may ensure complete shearing and may prevent the formation of needle-shaped burrs thereby ensuring higher surface quality of hot rolled products and preventing the damages to work rolls.

The present invention will become more apparent from the following description of one preferred embodiment thereof taken in conjunction with the accompanying drawings, in which.

Since the construction of one side of the shearing device in accordance with the present invention is substantially similar to that of the other side, only one side will be described in this specification.

Figure 1:
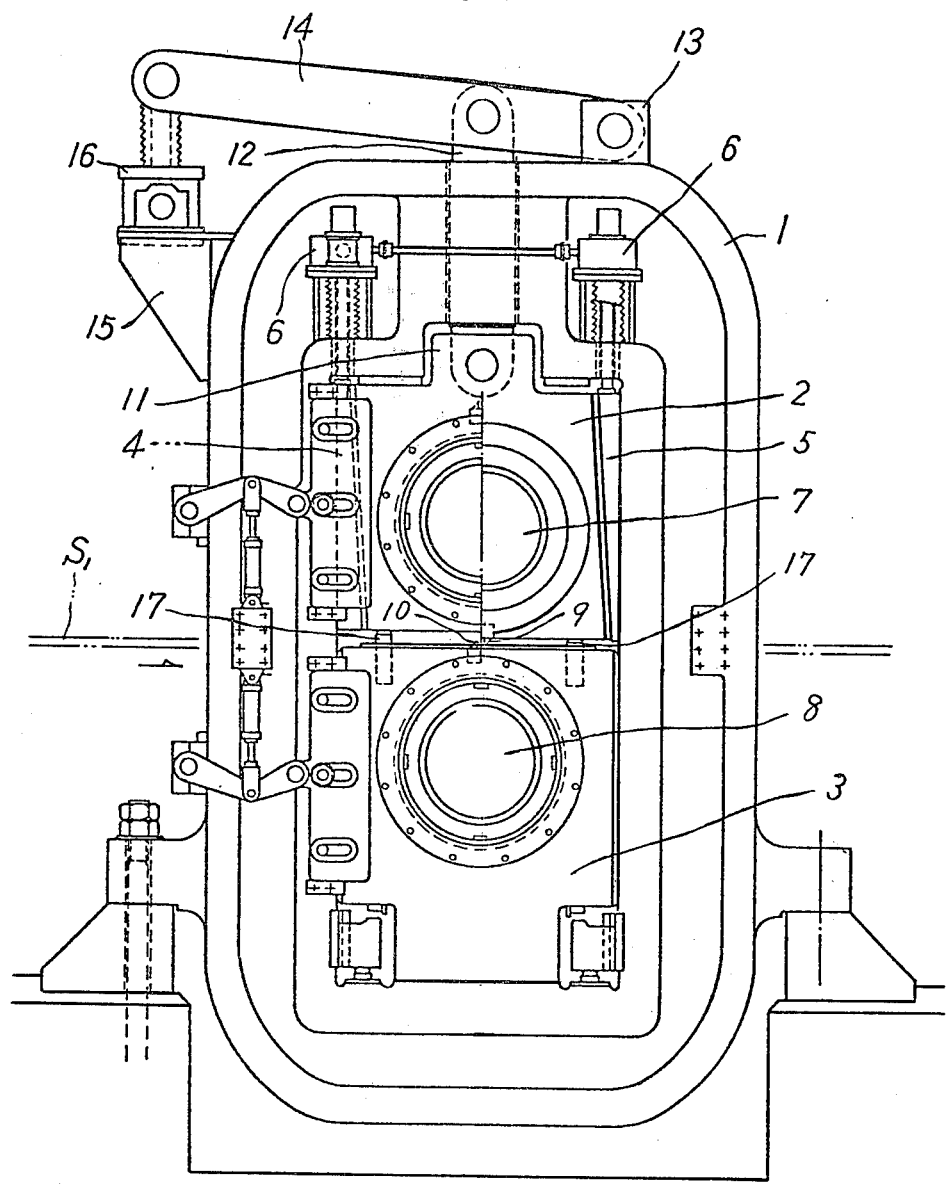
FIG. 1 is a side view of a device for shearing a hot strip in accordance with the present invention.
Figure 2:
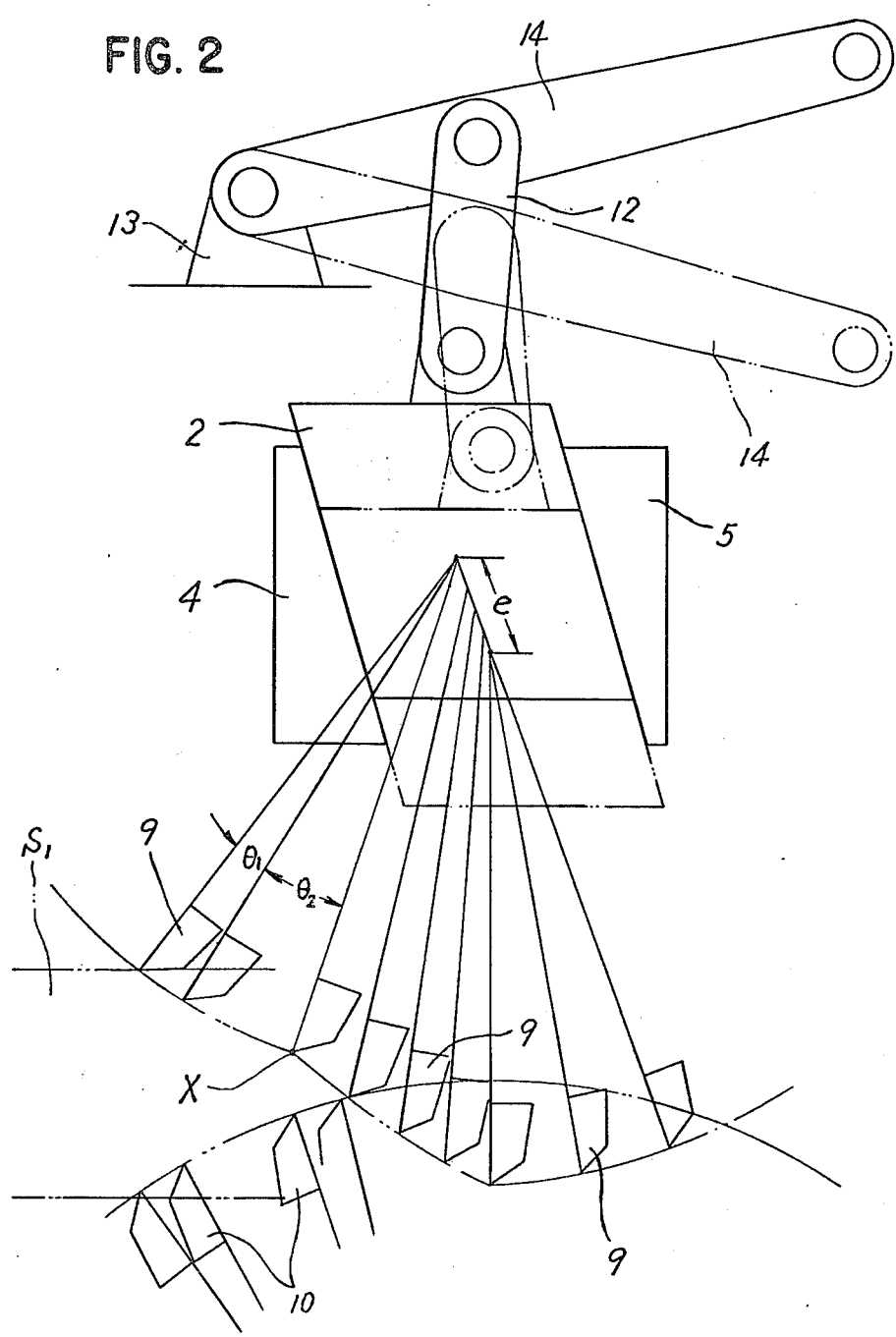
FIG. 2 is a fragmentary schematic view, on enlarged scale, thereof used for the explanation of the mode of operation.

Referring to FIGS. 1 and 2, a pair of housings or frames 1 are spaced apart widthwise by a suitable distance for passing a hot strip $S_1$ therebetween, and a lower bearing box 3 having a bearing (not shown) is vertically movably mounted on the lower portion of the housing frame 1 so that its position may be suitably adjusted.

Guide wedges 4 and 5 are slidably mounted on guide surfaces at the upper portion of the housing or frame 1 and are operatively coupled to adjusting means 6, respectively, so that their vertical positions may be suitably adjusted, and an upper bearing box 2 having a bearing box (not shown) is slidably fitted between the inclined surfaces of the wedges 4 and 5 in such a way that the downward and upward movement of the upper bearing box 2 at an angle relative to the vertical may be permitted as will be described in more detail hereinafter.

An upper horizontal blade 9 is detachably mounted on an upper drum 7 rotatably supported about a horizontal axis, between the upper bearing boxes 2 while a lower horizontal blade 10, on a lower drum 8 rotatably supported about a horizontal axis below and transverse to the longitudinal axis of said hot strip, between the lower bearing boxes 3, and the upper and lower blades 9 and 10 engage and disengage for effecting shearing of the hot strip $S_1$. Thus the axes of said drums are parallel and spaced and are initially contained in a common generally vertical plan.

The lower end of a link 12 is pivoted to a bracket 11 anchored to the top of the upper bearing box 2 while the other or upper end is extended through an opening formed through the top of the housing or frame 1 and is pivoted to a suitable point between the ends of a lever 14 whose one end is pivoted to a bracket 13 mounted on the top of the housing or frame 1 and whose the other end is pivoted to the free end of a piston rod of a hydraulic cylinder which is driving means and is mounted on a bracket 15 firmly attached to the housing or frame 1. Upon actuation of the hydraulic cylinder 16 the lever 14 swings so that the link 12 is caused to stroke a distance e (See FIG. 2) which is dependent upon the ratio of a distance between the one end of the lever 14 and its fulcrum point to a distance between the other end and the fulcrum point. Thus, the horizontal axis of the upper drum 7 is progressively displaced downwardly at an acute leading angle relative to the vertical in the direction of strip feed.

Balance cylinders 17 are mounted on the lower bearing box 3 for pressing the bottom of the upper bearing box 2 upwardly at a constant pressure.

Figure 3:
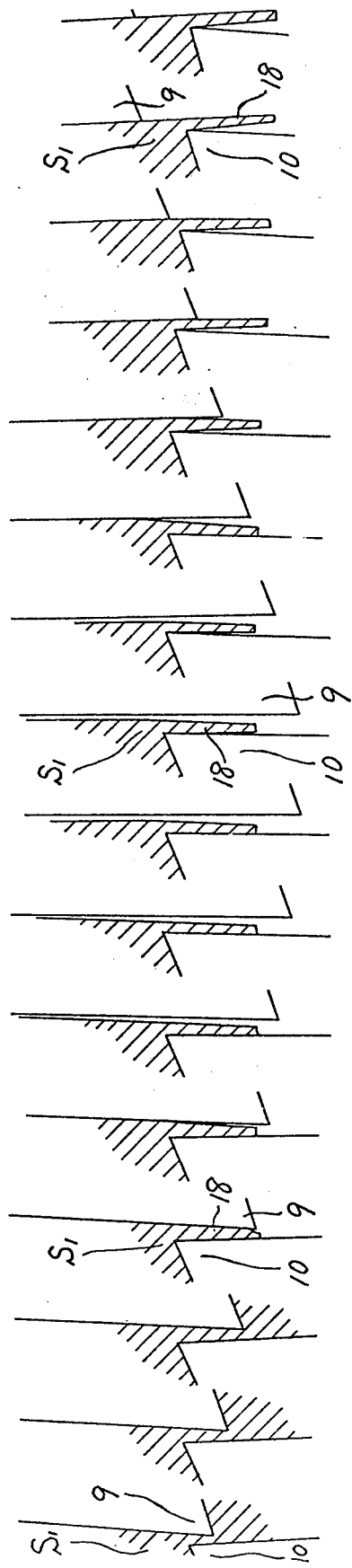
FIG. 3 shows the steps of shearing a hot strip with the device shown in FIG. 1.
Figure 4:
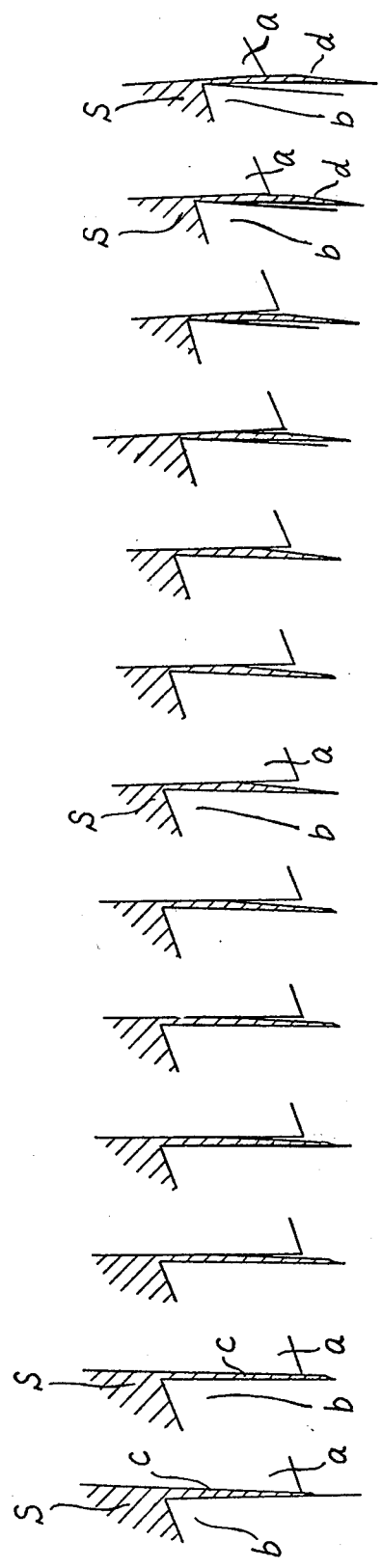
FIG. 4 shows the steps of shearing a hot strip with a prior art shearing device.

Referring to FIG. 3, reference numeral 18 denotes a burr caused when shearing is effected.

Referring back to FIGS. 1 and 2, the upper and lower drums 7 and 8 are drivingly coupled through upper and lower spindles (not shown) to a driving device (not shown).

Next the mode of operation of the preferred embodiment with the above construction will be described. When the hot strip $S_1$ is fed into the shearing device and reaches a predetermined position, a sensor (not shown) gives a signal to the driving device (not shown) and in response to this signal the driving device is energized to drive the upper and lower drums 7 and 8.

Upon rotation of the upper and lower drums 7 and 8, the upper and lower blades 9 and 10 describe circular paths or loci, starting the shearing of the hot strip $S_1$ as best shown in FIG. 2 while both the link 12 and lever 14 remain stationary in the positions indicated by the solid line in FIG. 2 so that the upper drum 7 is not permitted to move downward.

The upper and lower blades 9 and 10 rotate through an angle $\theta_1$ and then through an angle $\theta_2$ as shown in FIG. 2, shearing the hot strip $S_1$ while describing a circular locus. When the cutting edge of the upper blade 9 reaches a point X shown in FIG. 2, another sensor (not shown) outputs a signal to the hydraulic cylinder 16 to energize it.

Upon energization of the hydraulic cylinder or driving means 16, the lever 14 is caused to swing in the clockwise direction in FIG. 2 about the axis of a pin with which the lever 14 is pivoted to the bracket 13 so that the link 12 and hence the upper bearing box 2 are lowered. That is, the upper bearing box 2 is caused to move downwardly at an angle relative to the vertical along the inclined surfaces of the wedges 4 and 5 so that the upper blade 9 is lowered while rotating and consequently describes a non-circular path or locus as indicated by the two-dot chain lines in FIG. 2, whereby the hot strip $S_1$ is completely sheared.

When the upper drum 7 rotates through an angle at which the complete shearing of the hot strip $S_1$ is effected, a further sensor outputs a signal to the hydraulic cylinder or driving means 16 to reverse it or to swing in the counterclockwise direction in FIG. 2 so that the bearing box 2 is moved upward along the inclined guide surfaces of the wedges 4 and 5 to the initial position. After the upper bearing box 2 has been returned to its initial position, the upper blade resumes describing a circular path or locus. While the upper blade describes first a circular locus, then a non-circular locus and then a circular locus again in the manner described above, the lower blade keeps describing a circular locus. The points in time when the upper blade starts describing a non-circular path and resumes to describe a circular path are controlled in response to the output signals from the sensors so that the deviation in timing of the change of the upper blade from a circular path to a non-circular path or from a non-circular path to a circular path again may be substantially eliminated by the suitable adjustment of the positions of the sensors.

When the hot strip $S_1$ is sheared in the manner described above, the burr 18 is formed as shown in the steps of shearing in FIG. 3. However, the upper bearing box 2 is lowered in the same direction as the strip $S_1$ as best shown in FIG. 2 so that the clearance between the upper and lower blades 9 and 10 is increased and consequently the formation of needle-shaped burrs may be prevented.

It is to be understood that various modifications of the present invention may be effected without departing from the true spirit thereof. For instance, so far the upper blade has been described as being forced to describe a non-circular locus when shearing is effected, but the lower blade or both of the upper and lower blades may be so arranged as to describe a non-circular locus. In addition, any suitable mechanical means may be used for driving the upper or lower bearing box and they are for example of the cam, crank or gear types.

The novel features and advantages of the present invention may be summarized as follows:

(I) Since the blade may describe a non-circular locus, the degree of lapping may be considerably increased as compared with the prior art shearing devices so that reliable and complete shearing may be effected.

(II) The rate at which the upper blade moves away from the lower blade when shearing is to be completed is faster when the upper blade describes a non-circular locus than when it describes a circular locus so that greater force is produced for shearing a crop from a hot strip and consequently shearing may be much facilitated.

(III) Since the clearance or gap between the upper and lower blades may be prevented from being narrowed, no needle-shape burr is formed so that the damages to the surface of a hot strip and hence the degradation of its quality may be prevented and also the damages to work rolls may be eliminated.

What is claimed is:

1. A method for shearing a continuously traveling horizontally arranged hot strip into a plurality of successive sections, comprising the steps of:
   (a) moving a horizontally arranged hot strip along its longitudinal axis;
   (b) rotating a first horizontal blade about a horizontal parallel spaced axis above and transverse to the longitudinal axis of, said hot strip;
   (c) rotating a second horizontal blade about a horizontal parallel spaced axis below, and transverse to the longitudinal axis of, said hot strip, the axes of said blades being initially contained in a common vertical plane; and
   (d) progressively displacing the axis of one of said blades toward the other axis with the axis of said one blade being maintained horizontal, the path of movement of said one axis being contained in a plane that is arranged at an acute leading angle relative to said vertical plane in the direction of travel of the strip, whereby said one blade follows a non-circular locus during shearing and travels faster than the other blade in the direction of strip travel, thereby to eliminate the formation of needle-shaped burrs.

* * * * *